United States Patent [19]

Tobol

[11] Patent Number: 5,253,252
[45] Date of Patent: Oct. 12, 1993

[54] TOKEN DEVICE FOR DISTRIBUTED TIME SCHEDULING IN A DATA PROCESSING SYSTEM

[75] Inventor: Nathan Tobol, Wrentham, Mass.
[73] Assignee: The Foxboro Company, Foxboro, Mass.
[21] Appl. No.: 668,363
[22] Filed: Mar. 12, 1991

Related U.S. Application Data

[63] Continuation of Ser. No. 295,453, Jan. 10, 1989, abandoned.

[51] Int. Cl.$^5$ ............................................. H04J 3/06
[52] U.S. Cl. ................................. 370/85.5; 370/85.6; 370/100.1
[58] Field of Search ............. 370/85.4, 85.5, 85.6, 370/85.15, 100.1, 103; 340/825.05, 825.51

[56] References Cited

U.S. PATENT DOCUMENTS

| | | | |
|---|---|---|---|
| 4,354,229 | 10/1982 | Davis et al. | 364/200 |
| 4,456,956 | 6/1984 | El-Gohary et al. | 364/200 |
| 4,539,679 | 9/1985 | Bux et al. | 370/85.4 |
| 4,584,643 | 4/1986 | Halpern et al. | 364/200 |
| 4,593,280 | 6/1986 | Grow | 370/85.5 |
| 4,596,025 | 6/1986 | Satoh | 370/94.1 |
| 4,602,365 | 7/1986 | White et al. | 370/85.5 |
| 4,627,051 | 12/1986 | Shimizu | 370/85.4 |
| 4,649,535 | 3/1987 | Ulug | 370/85.5 |
| 4,667,323 | 5/1987 | Engdahl et al. | 370/85.4 |
| 4,674,086 | 6/1987 | Szczepanek et al. | 370/85.5 |
| 4,707,830 | 11/1987 | Ulug | 370/85.4 |
| 4,709,347 | 11/1987 | Kirk | 364/900 |
| 4,766,530 | 8/1988 | Roslund | 364/200 |
| 4,771,391 | 9/1988 | Blasbalg | 364/200 |
| 4,789,982 | 12/1988 | Coden | 370/85.5 |

OTHER PUBLICATIONS

"Update on Local Area Network Standards" by Tony Bolton, I&CS—*The Industrial and Process Control Magazine*, Nov. 1983, pp. 27–31.
*IEEE802.4* "Token passing Bus Access Method and Physical Layer Specifications" Draft J, Jan. 1988, The Institute of Electrical and Electronics Engineers, Inc., pp. 59–82.
"Proway-Lan Industrial Data Highway Standard", ISA-S72.01-1985 by the *Instrument Society of America*, pp. 73–80 and 104–109.

*Primary Examiner*—Douglas W. Olms
*Assistant Examiner*—Min Jung
*Attorney, Agent, or Firm*—Hamilton, Brook, Smith & Reynolds

[57] ABSTRACT

A token passing media access protocol provides distributed time scheduling. The token provides an indication of each time at which a network device is to perform a cyclic or time critical operation. The token also provides an indication of system time to enable all devices on the network bus to be synchronized. The format of data transmissions on the network bus employs a shortened device address when referencing the device as a source. The source address corresponds to a unique portion of the device address.

17 Claims, 3 Drawing Sheets

TOKEN FORMAT

TOKEN DEVICE FOR DISTRIBUTED TIME SCHEDULING IN A DATA PROCESSING SYSTEM

This is a continuation of co-pending application Ser. No. 07/295,453 filed on Jan. 10, 1989 now abandoned.

BACKGROUND

In many of today's data processing systems, including Local Area Networks (LAN's), it is often desirable to have devices manufactured by different vendors communicate to each other within the network. Typically, each device is connected to a transmission medium such as a main bus of the network, either directly or through an interface component. Before transmission, outgoing messages from a sending device are formatted in a manner which is acceptable by the receiving device. Upon receipt of the transferred data, the receiving device disassembles the message and acknowledges that the message has been successfully transferred.

In order to achieve such communications however, it is necessary for the devices to follow the same communications throughout the network, or at least throughout the shared bus. Currently there exists several Media Access Control protocols (MAC's) for device transmission or communication over a shared network bus. One such protocol requires the device to listen for no activity across the bus before transmitting signals on the bus. After transmission, the device listens for responses to the transmission to determine the failure or success of the transmission. Failure may occur where two or more devices attempt to transmit simultaneously.

Another protocol, employed by Ethernet (TM), follows the access method known as Carrier Sense Multiple Access with Collision Detection (CSMA/CD). The CSMA/CD method uses the principle of "listen before transmitting, listen while transmitting" to gain access to the network. Each device on the network listens to the bus and does not transmit if the bus is in use. If a bus detects silence, it is able to transmit. There is still the possibility of simultaneous transfers which cause failure of transmissions.

A token passing protocol (e.g. IEEE 802.4 Standard) enables devices on the network to share access without the possibility of simultaneous transfers which cause transmission failure. In this protocol, a bus token provides permission to a device to transmit signals over the bus. The token is passed from one device to another around the network in an established order which forms a logical ring (not necessarily a physical ring). Only the device with the token is allowed to transmit, thus eliminating collisions during normal operations. This protocol results in a network that is highly controllable, predictable and stable under all communication loads.

SUMMARY OF THE INVENTION

Typically, many of the devices of a network have either cyclic or time critical operations to perform which require transmitting signals over the bus at specific times. With the token passing protocol, a device with time critical operations (e.g. cyclic sampling in a process control system) may not have possession of the token at the necessary times and is without means of obtaining the token at times outside of the established order. A further problem with the token passing protocol is global time synchronization of the devices connected to the network bus.

Accordingly, there is a need for an improved passing protocol. Specifically there is a need for a network bus protocol which supports distributed real time data acquisition and network wide synchronization of the devices.

The present invention provides a distributed time scheduling MAC protocol which is an enhancement of the Token Bus MAC and allows for needs of distributed real time data acquisition systems. The protocol of the present invention provides deterministic scheduling of cyclic and time critical operations of respective devices in the network. Such scheduling overcomes the time jitter problems of cyclic and time critical operations in prior art token bus protocols. In addition, the present invention provides for all devices on the network bus to have their internal clocks synchronized to an arbitrary small time interval (e.g. one millisecond).

The foregoing is accomplished in a data processing system, having a multiplicity of devices connected to a communication bus, by the use of a special bus token formation and protocol. The bus token indicates the times at which devices that have time critical or cyclic operations are to gain possession of the token out of order in the ring to enable performance of the time critical operation. Preferably, the token further provides means for returning the token to the device that was preempted at the time the device having a time critical/cyclical operation gained possession of the token. As a result the established order in which the token is passed from one device to another in the network is resumed.

In accordance with another aspect of the present invention, one of the devices serves as a bus master which is responsible for broadcasting to all devices on the bus a time synchronization message at times when the bus master device has the token. Upon receipt of this message by a device, the device adjusts its internal clock means to be synchronized with the time indicated by the bus master's message. The device also records an identification number called a sequence number of the message. The bus master also indicates the current broadcast time synchronization message on the token. The indication in the token includes the sequence number of this latest broadcast synchronization message.

Each device, upon receipt of the bus token, affirms that it has received the latest time synchronization message from the bus master by comparing its last recorded sequence number to the sequence number on the token. If the sequence numbers match then the device assumes its internal clock is synchronized. The indication of the last broadcast synchronization message on the token thus ensures synchronization of each device on the bus.

If the sequence numbers do not match, the device is able to request the bus master to broadcast the current time. Upon such a request, the bus master broadcasts to all devices the current sequence number and the elapsed time since the synchronization message which carried the current sequence number was transmitted. Thereafter each device is able to update its internal clock means as appropriate.

In addition, each device has an address by which the other devices communicate to it through the network bus. The address has different sizes depending on whether the address references the device as a source or destination. Preferably, the address referencing the device as a source is smaller in size than the address referencing the device as a destination. Such addressing is practical since lower values can be used as the physical address with zeros discarded in the source address. The device always knows its own physical address and thus only needs its physical address to reference itself as a source, whereas allowance must be made for referencing the destination device by its full logical address. This addressing scheme reduces message overhead substantially. Typical data frame transmission in prior art token passing protocols is 20 octets, the data transmission overhead in the format of the present invention is only 10 octets.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENT

Figure 1:
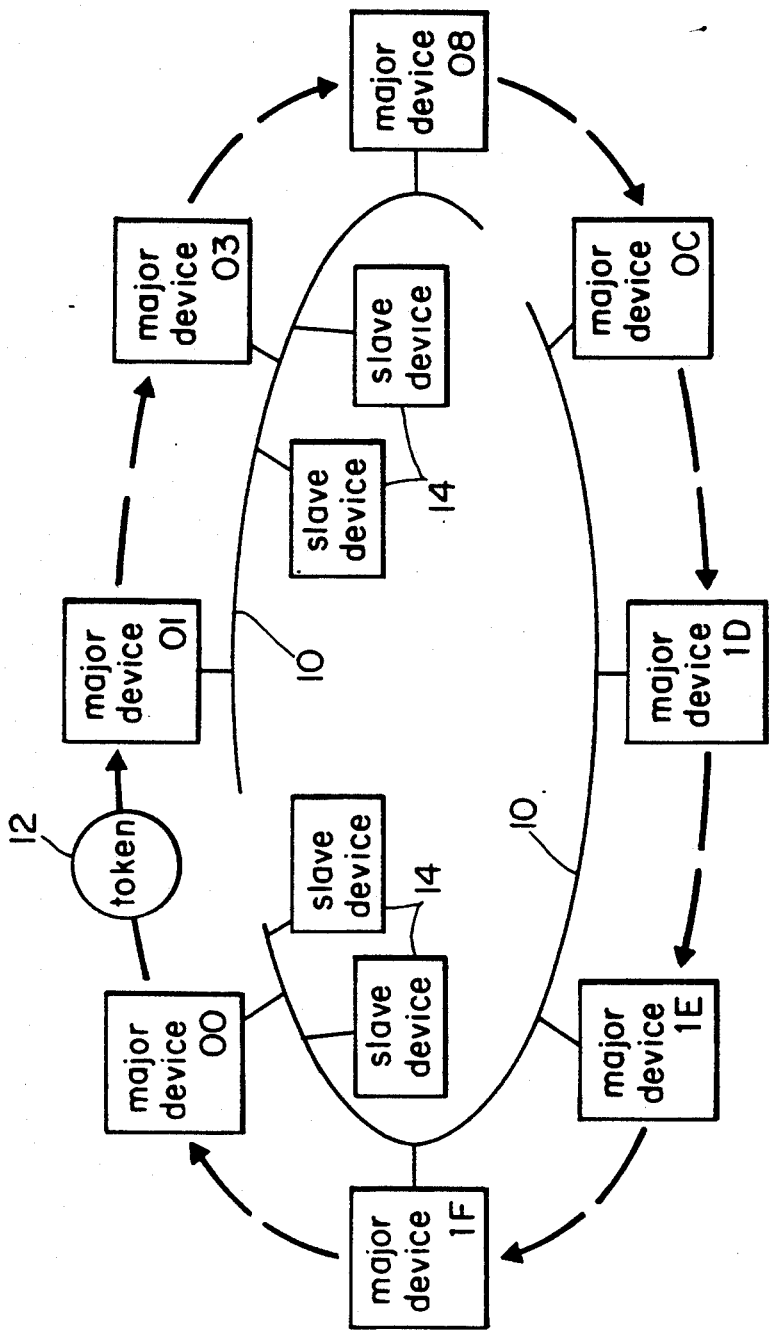
FIG. 1 is a schematic illustration of token passing in a network, forming a virtual ring.
Figure 2:
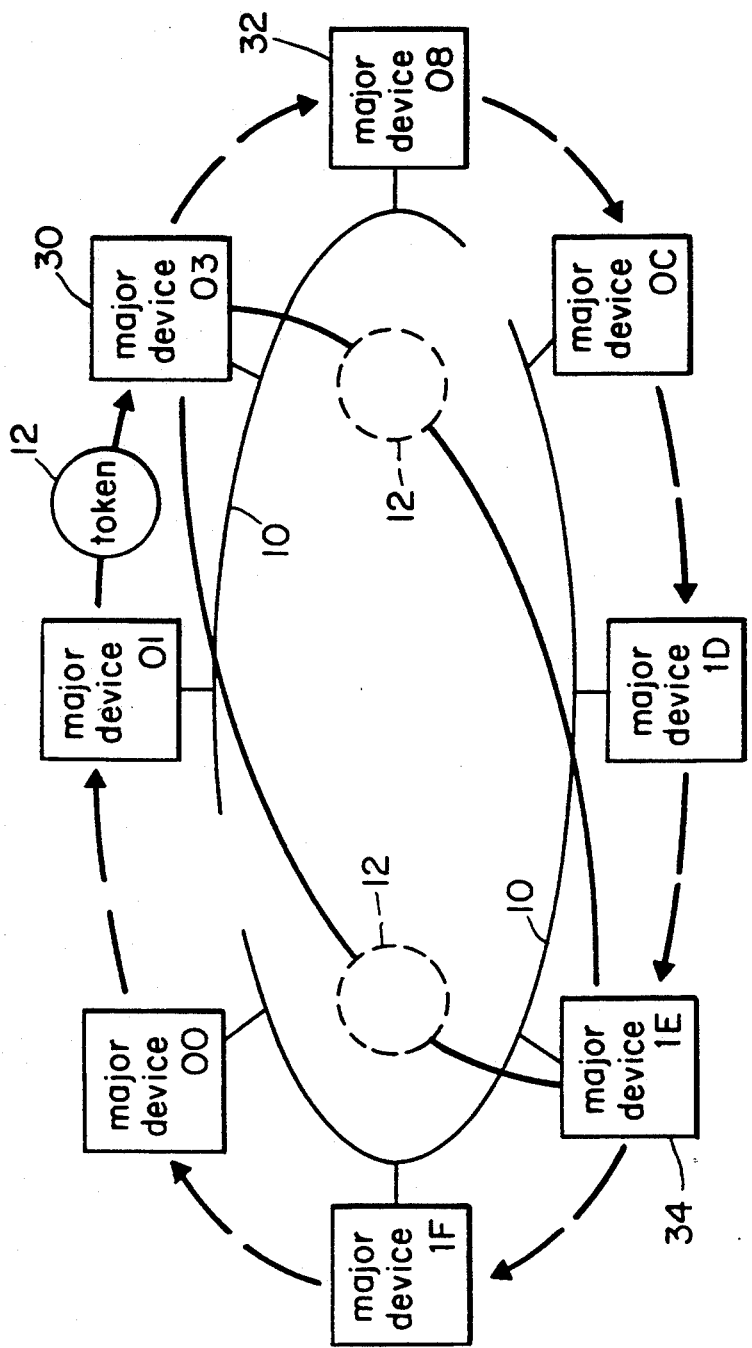
FIG. 2 is a schematic illustration of scheduled preemption of token passing in an embodiment of the present invention.

A local area network or data processing system employing the token passing bus access method of the present invention is illustrated in FIGS. 1 and 2. The network generally comprises a plurality of various major and slave devices represented here by squares. A major device is included in the token passing ring (described below) and is able to communicate to other devices, and a slave device 14 generally does not receive the token and is thus dependent on a major device to initiate communications. The devices are connected by common methods to a bus 10 which enables communication between the devices.

As in a typical bus employing a token passing protocol, there is a baton or token 12 that controls the right of access to the bus 10. Only major devices are able to receive the token 12, and the major device which currently holds the token 12 has momentary control over the bus 10. Only that device, while holding the token 12, can transmit messages on the bus 10 and may include in a message the right for a receiving device (major or slave) to respond over the bus 10. Transmission on the bus 10 may optionally be in a broadcast manner such that all devices may receive all signals transmitted.

The token 12 is passed in an established order by the major devices residing on the bus 10. The passing of token 12 from major device to major device (00, 01, 03, 08, 0C, 1D, 1E, 1F in FIG. 1) forms a virtual or logical ring as depicted in FIG. 1. The order of the devices in this ring is not dependent on the order of physical connectivity of the major devices to bus 10. Further in accordance with the right to respond mentioned above, a slave device 14 can respond to a query from the major device currently holding the token 12 even though (i) the slave device 14 is not part of the logical ring, and (ii) the slave device 14 cannot initiate a transmission since it will never be in possession of the token 12.

In the present invention each major device maintains internal clock means which are synchronized by the following scheme. One of the major devices serves as a bus master which is responsible for periodically broadcasting to all other devices on bus 10 a time synchronization message. Specifically, when the bus master is in possession of token 12, the bus master transmits a sequence number which identifies the message and the amount of time which has elapsed since the last time synchronization message was broadcast. Upon receipt of the broadcast message, each major device records the sequence number, compares the elapsed time in the message with its own clock and resets and adjusts its clock.

Figure 3A:
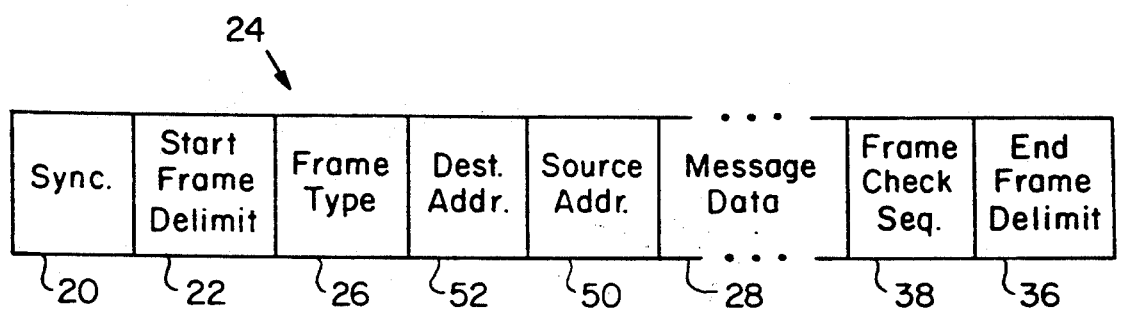
FIG. 3a is a schematic diagram of the frame format employed for all transmissions in the token passing network of the present invention.
Figure 3B:
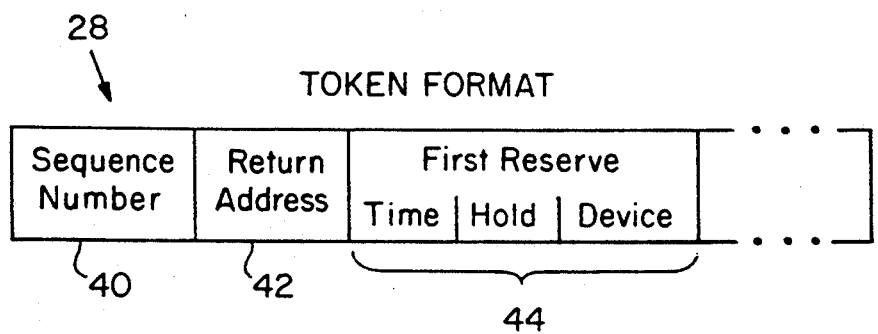
FIG. 3b is a schematic diagram of the format of the message field in the frame format of FIG. 3a for a token in the present invention.

As shown in FIG. 3b and described in more detail later, the bus master also indicates this last broadcast time synchronization message on token 12 by the sequence number to provide error checking of each major device which receives token 12. That is, when a major device receives the token 12, the device compares the sequence number it has recorded to the sequence number indicated on token 12. If the sequence numbers match, the device is assured that it has received the latest time synchronization message from the bus master and that its internal clock is synchronized with the current timing of the network. By each major device similarly checking its recorded sequence number upon receipt of the token 12, the major devices of the network become synchronized with respect to each other.

If the sequence numbers do not match, the device requests the bus master to broadcast the current synchronization number and the elapsed time since the most recent synchronization message. The bus master does so and all major devices on bus 10 are able to receive the present time over the bus to update their respective internal clock means.

Such network wide synchronization of the major devices enables a further feature of the present invention. Along with the right of bus access, the token of the present invention provides scheduled or reserved times of bus use by specified devices. A list of reserved times of bus use is provided in token 12 to enable a scheduled preemption of the possession of token 12 which ultimately enables the preempting device to perform time critical operations at the scheduled/reserved time. An illustration of such a preemption is provided in FIG. 2.

After a major device 30 receives token 12 in the normal logical ring passing of the token, it uses the bus 10 until i) it runs out of transmissions to make, ii) the maximum token holding time expires, or iii) a reserved time occurs. If one of the former two events occur, major device 30 passes the token 12 to major device 32, the logically succeeding device in the formed virtual ring. However, if scheduled or reserved time occurs, device 30 passes token 12 to the device, for example device 34, which reserved the occurring time. Device 34 then performs data transmissions and operations desired until one of the three above stated events occur. For simplicity of illustration, after device 34 runs out of transmissions to make or the token holding time expires, device 34 returns token 12 to device 30 which was preempted with the reserved bus use time of device 34. Device 30 then resumes operation, and the passing of token 12 about the logical ring is effectively restored.

In order for a major device to schedule bus time on token 12, it must have possession of token 12. The device then adds its time reservation to token 12 following three rules. First, the reservations in token 12 are kept in time sequence order. So new reservations must be added to the list of reservations at the correct point. Second, the time reserved does not overlap the reserved hold time of the previous reservation and the reserved hold time from the following reservation. Third, each device cannot have more than one reserved time scheduled in token 12 at one time.

In addition, the bus master is responsible for updating or modifying the time specifications of reservations when the sequence number on token 12 is changed. That is, when the bus master transmits a time synchronization message it effectively defines a new current zero-time reference point. The time to which the reservations on token 12 refer are presently based on the previous zero-time reference point. Hence, the bus master must convert the reservation times on token 12 to be based on the new current zero-time reference.

The above time reservation scheme, with the aid of the time synchronization scheme, provides deterministic scheduling in the network which is unavailable in prior art token passing busses. Such deterministic scheduling is particularly advantageous in systems with time critical or cyclic operations such as process control systems and voice data PABX systems. That is, various major devices in a network may support slave devices which require sampling on a regular basis. Each of such major devices must have access to the bus at the respective sampling times. In addition, the sampling times of different devices must not overlap since only one device at a time can be using the bus. Even if the initial sampling times do not overlap, the integrity of the intervals between the sampling times of the different devices must be maintained so that the sampling times do not move (or jitter) cycle after cycle. With the token of the present invention, both cyclic and time critical operations can be scheduled with minimum jitter.

Steady state operation of the network of the present invention thus comprises a data transfer phase and a token transfer phase. Ring maintenance functions exist within each major device and include ring initialization, los token recovery, new device entry to the logical ring, and general maintenance of the logical ring as is understood from the IEEE 802.4 Token Passing MAC standard or described below.

In the preferred embodiment, all transmissions (data and tokens 12) on bus 10 are implemented by formatted data blocks or frames 24 shown in FIG. 3a. The first field 20 of a frame 24 holds a bit pattern which synchronizes the phase of the transmitted frame with the phase of the receiving device as is common in the art for bit synchronization. The length and specific pattern of field 20 are dependent upon the modulation technique used by the devices. Bit synchronization patterns such as those used by BiSynch, HDLC, SDLC and IEEE 802.4 standards are suitable.

The second field 22 of frame 24 is a delimiter marking the end of the first field 20 and the beginning of the information portion of the frame portion of frame 24 is marked by an end of frame delimiter 36. Preceding the end of frame delimiter 36 is a field 38 used for error detection. Field 38 holds a frame check code, such as a cyclic redundancy check which is generated and sent by the device transmitting the frame 24. The receiving device checks field 38 for correctness.

All devices attached to the bus 10 have their own individual addresses. In addition, devices may also recognize one or more group addresses. Most group addresses are user assignable, but some are reserved for specific bus management functions. The addresses used in the preferred embodiment are as follows:

| ADDRESSES (BASE 16) | | MEANING |
|---|---|---|
| 0000 | through 001F | Major Device Addresses |
| 0020 | through 00FF | Slave Device Addresses |
| 0100 | through FFEF | User Assignable Group Addresses |
| FFF0 | through FFFF | Reserved Group Addresses |
| | FFF0 | Current Bus Master |
| | FFF1 | All Devices That Have Scheduled (Reserved) Bus Time |
| | FFF2 | All Major Devices |
| | FFF3 thru FFFD | Reserved |
| | FFFE | Null Address (no device) |
| | FFFF | Broadcast to all |

The frame 24 has a destination field 52 and a source field 50 for specifying the device to which the frame is being transmitted and the transmitting device, respectively. The destination field 52 holds the 16 bit address of the receiving device.

The source field 50 holds the address of the transmitting device and is always either a major or a slave device address, it is never a group or broadcast address. When referenced as a source, however, the address of the device is preferably only 8 bits long and contains the unique 8 lower order bits of the device's address. Thus, there is a difference in length of the address used for a device depending on whether the device is being referenced as a source or a destination. This difference in length enables source field 50 to be smaller than destination field 52 and the total frame length to be minimized. To that end, message overhead is optimized.

The frame type field 26 specifies the type of information (e.g. token or message) carried by the message data field 28 of the frame 24. In the preferred embodiment, the frame type field 26 holds an 8 bit binary code which corresponds to a message/frame type listed in the following table:

| CODE (BINARY) | FRAME TYPE |
|---|---|
| 00000000 | TEST (no message data sent) |
| 00000001 | SOLICIT_SUCCESSOR |
| 00000010 | SOLICIT_IN_RING (no message data sent) |
| 00000011 | WHO_FOLLOWS |
| 00000100 | ACK (no message data sent) |
| 00000101 | SOLICIT_BUS_MASTER |
| 00000110 | CLAIM_BUS_MASTER (no message data sent) |
| 00000111 | REJECT (no message data sent) |
| 00001000 | TOKEN |
| 00001001 | RESERVED_TOKEN |
| 00001010 | DELEGATE_TOKEN (no message data sent) |
| 00001011 | RETURN_TOKEN |
| 00001100 | SET_SUCCESSOR (no message data sent) |
| 00001101 | REQUEST_DELTA_TIME |
| 00001110 | DELTA_TIME |
| 00001111 | TIME_SYNC |
| 01000000 | DATA_MESSAGE |
| 01001000 | REQUEST_WITH_RESPONSE |
| 01010000 | RESPONSE |

The message data field 28 for the frame type 26 SOLICIT_SUCCESSOR comprises an 8 bit follower address of the device logically succeeding the device transmitting the frame. The frame is transmitted by a device to determine if a device is trying to enter the logical ring.

The message data field 28 for the frame type 26 WHO_FOLLOWS comprises an 8 bit follower address of the device logically succeeding the device transmitting the frame. This frame is used after a device has unsuccessfully attempted to communicate to its current successor and wishes to change its successor to be the device following the current successor. This effectively deletes the current successor from the logical ring.

The message data field 28 for the frame type 26 SOLICIT_BUS_MASTER comprises an 8 bit sequence number. This number is used by the device receiving the frame to determine if the device has the most recently (or latest) broadcast time synchronization message from the bus master.

The message data field 28 for the frame types 26 TOKEN, RESERVED_TOKEN and RETURN_TOKEN have a common token format shown in FIG. 3b. As mentioned above, token frames (i.e. token 12) are used to pass control of the bus 10 from one major device to another. Three types of token frames are used in the preferred embodiment of the present invention. The normal TOKEN frame is used to pass control of the bus to the next major device in the logical ring. The RESERVED_TOKEN frame is used by a major device to pass control of the bus 10 to another major device which has scheduled or reserved the present time on the bus 10. The RETURN_TOKEN frame is used to return control of the bus 10 to the major device that was preempted when a scheduled time occurred.

The token format has for its first field, sequence number field 40 for holding the sequence number of the latest broadcast time synchronization message.

The second field of the token format is an 8 bit return address field 42. This field 42 contains the address of the device whose operation was interrupted to service a scheduled event. The return address field 42 holds a valid value only in RESERVED_TOKEN frames.

The remaining fields of the token format are called reserve fields 44. Each reserve field 44 is formed of three parts, a reserve time, a reserve hold and a reserve device. The reserve time part is 16 bits long and holds a delay value in milliseconds relative to the last known network time transmitted in a TIME_SYNC frame (to be described). The reserve hold part is also 16 bits long and represents the maximum amount of time that a receiving device will hold the reserved token. The reserve device part is 8 bits long and specifies the major device address (in source address form) for which the bus time is being reserved.

The TIME_SYNC frame is used by the bus master to maintain distributed time synchronization. The bus master, when in possession of the token 12, broadcasts a TIME_SYNC frame over bus 10 to inform all major devices of the current timing of the network. The message data field 28 for a TIME_SYNC frame has an 8 bit sequence number (i.e. identification of this transmission) and a 16 bit elapsed time value which represents in milliseconds the amount of time that the bus master thinks has elapsed since the last TIME_SYNC broadcast. This value can be used by major devices to adjust their internal clocks and to check on the accuracy of the bus masters clock.

The message data field 28 for the frame type 26 REQUEST_DELTA_TIME has an 8 bit sequence number. The sequence number is used by the device (bus master) receiving the frame to determine if the transmitting device has the most recently synchronized current time synchronization message.

The DELTA_TIME frame is similar to the TIME_SYNC frame but is broadcast by the bus master in response to a REQUEST_DELTA_TIME frame. The DELTA_TIME frame has an 8 bit sequence number and a 16 bit time value. However, the time value in the DELTA_TIME frame represents the current time in milliseconds, and is referred to as the delta time value.

Operation of the network of the preferred embodiment using the above described frames is as follows. At initial bus startup, the major devices connected to bus 10 bid to become bus master. This is accomplished by a major device when it is initially powered on (or reset), listening to bus 10 to see if any other devices are active. If no devices are active, the initially powered major device sends the TEST frame to itself. If it receives the TEST frame without error, it continues to listen for a length of time proportional to its address. If the major device still hears no activity, it becomes bus master.

If the major device receives the TEST frame with error, due to other devices being active on bus 10, then the major device must retest. If two major devices initially being powered on or reset try to transmit their respective TEST frames at the same time, then the waiting period resolves the situation such that whoever has the lower address becomes bus master.

If a device that is not yet in the virtual ring hears bus traffic, it waits until it receives a SOLICIT_SUCCESSOR frame from a device in the ring. When the device gets this frame, it responds with a SET_SUCCESSOR frame. If the next frame that the device receives is the token 12, then the device has successfully entered the virtual ring.

Once a bus master has been established, a virtual ring is established that consists of all major devices connected to the bus which placed bids to become bus master. As the token is passed around the ring a schedule is formed that consists of an ordered list of all such devices with time critical or cyclic data requirements.

After the bus 10 has been initialized by the foregoing events, normal operation of the network begins. Generally speaking the normal device operation in the preferred embodiment is a set of rules that describe the receiving, holding (using) and passing of token 12 (the TOKEN frame). Each device has a sequence register and a delta time counter which counts in milliseconds. When a device receives a TIME_SYNC frame, the device loads the sequence number from the frame into the sequence register of the device, and compares the elapsed time of the TIME_SYNC frame to the current delta time count in the delta time counter of the device. If necessary the device adjusts the delta time counter to agree with the timing specified by the bus master as indicated in the TIME_SYNC frame.

Thereafter, once the device receives the token 12 (TOKEN frame), the device compares the sequence number in field 40 of the TOKEN frame with the sequence number loaded in the sequence register in the device from the last TIME_SYNC or DELTA_TIME frame received. If the sequence number in the token is not equal to the sequence number held in the sequence register of the device, the device recognizes that it failed to receive the last TIME_SYNC message and sends a REQUEST_DELTA_TIME message to the current bus master.

Thereafter, if the device receives a DELTA_TIME frame transmitted by the bus master in response to the request, the device loads the sequence number of the received frame into the sequence register and loads the delta time of the frame into the delta time counter of the device. The device may then proceed to operate and knows it is synchronized.

If the device does not receive a reply to its request for a delta time, the device retries the REQUEST_DELTA_TIME operation the number of times specified by the system parameter TIME_RETRY. If the device still receives no reply, the device tries to find a new bus master and obtains the current network time from that device. If the device still receives no reply, the device goes into diagnostic procedures.

The error recovery procedure applies when there is no reply to messages addressed to the bus master is as follows. The procedure first attempts to communicate with the major devices that have reserved time on token 12 to become bus master. Only if none of these devices can become bus master does the device in search of a new bus master search the entire address list looking for a major device to be bus master. If the search of the entire address list fails, the device in want of a bus master assumes that the problem may be internal to itself, such as a failing transmitter or receiver, and enters an error state.

If the major device in possession of the token has or receives the latest time synchronization information, then the device uses the token 12 until (i) the current time as indicated in its second register is equal to the time part of the first reserved field 44 of token 12, (ii) the token holding timer of the device expires or (iii) the device runs out of messages to transmit on bus 10. Note that since the reservations are always held by token 12 in time sequence order, only the first reserve field needs to be tested.

If, while a device is holding the token 12, the current time as indicated in the second register of the device becomes equal to the time of the first reserve field 44, the device holding token 12 must pass the token (in the form of a RESERVED_TOKEN) to the device that reserved the time. The address of the time reserving device is found in the third (device) part of the first reserve field 44. The device holding token 12 halts its token holding timer, sets its own address as the return address in the RESERVED_TOKEN frame and sends the RESERVED_TOKEN frame to the time reserving device. When the time reserving device is finished with the token, it sends a return token in the form of a RETURN_TOKEN frame back to the first device that passed the time reserving device the token 12. The first or preempted device restarts its token holding timer and continues with its operations.

When a device receives a RESERVED_TOKEN, the device uses the token until the maximum amount of time allowed for the reserve token to be held, as indicated in the hold part of the reserve field 44, expires or until the device runs out of messages to transmit on bus 10. When either of these events occur, the device must send a RETURN_TOKEN frame back to the device from which it received the token 12. Before the device returns a return token, the device must remove its current reservation (the one for which it received the token 12) and may add a new reservation for a future time dependent operation.

For each major device holding token 12, when the holding timer of the device expires, or the device runs out of frames to transmit, the device sends the token to the next device on the virtual ring.

Operation of the bus master device in addition to all of the normal device functions is as follows. The bus master has two major duties as a time keeper for bus 10. A first major duty provides that every time that the current bus master device receives token 12, the bus master has the option of sending a TIME_SYNC to all devices on bus 10 by using the broadcast address FFFF for the destination address 52 of the frame. When the bus master sends this frame, it also updates the TOKEN frame relative to the new synchronized time. This includes updating the sequence number field of the TOKEN frame as well as translating the reserved time field in each of the reserve fields 44 of the TOKEN frame.

A second major duty of the bus master is to respond to REQUEST_DELTA_TIME frames received from devices that fail to receive the current TIME_SYNC broadcast. In response to the REQUEST_DELTA_TIME frame the bus master broadcasts the sequence number and delta time in milliseconds. Each device on bus 10 is able to receive the delta time message and simply loads both values (sequence number and delta time) into respective registers (sequence counter and delta time counter) of the device.

In the case where the device currently in possession of the token 12 fails, then it is the responsibility of the bus master to recover from this situation. In order to perform such a recovery, the bus master device listens to bus 10 periodically. If the bus master hears no activity on bus 10 for a predetermined length of time, then the bus master transmits a new token 12. Known recovery routines are used to patch the virtual ring where the device failed, to update the successor address of the device logically preceding the failed device and to resume logical passing of the token.

If the device which failed was the current bus master, then all remaining devices wait a period of time equal to (their device address plus three) multiplied by the maximum round trip delay time through the network multiplied by two. After waiting for this amount of time, the procedure for bidding to become a master is invoked.

Major/slave device operation in the present invention is specifically designed to require minimum intelligence on the part of slave device 14. All operations, with the exception of the optional slave to slave messaging (as described below), are controlled by the major device. Slave devices 14 accept all DATA_MESSAGE, RESPONSE, REQUEST_WITH_RESPONSE, DELEGATE_TOKEN messages that are addressed to them. Slave devices 14 must be able to recognize a slave device address and may be able to recognize any number of group addresses.

When a slave device 14 receives a REQUEST_WITH_RESPONSE frame, it must respond with either a RESPONSE frame or an ACK frame.

When slave device 14 receives a DELEGATE_TOKEN frame, the slave device has the option of sending a frame and receiving a reply from any device attached to the bus 10 if the frame is a REQUEST_WITH_RESPONSE. If the slave device 14 does not have a frame to send, or it does not implement this optional function, the slave device 14 responds to the DELEGATE_TOKEN frame with an ACK frame.

A further description of the programming code for the foregoing procedure and other procedures of the preferred embodiment can be found in the attached appendix.

While the invention has been particularly shown and described with reference to a preferred embodiment thereof, it will be understood by those skilled in the art that various changes in form and details may be made therein without departing from the spirit and scope of the invention as defined by the appended claims.

APPENDIX

Token Device
DISTRIBUTED TIME SCHEDULING IN A
DATA PROCESSING SYSTEM

PSEUDO-CODE FOR PROTOCOL

The following pseudo-code, written in "C", defines device operation. These procedures are divided in to two major section, the procedures that apply to master devices and the procedures that apply to slave devices. The master device procedures are further subdivided into three subsections, those procedures that apply to all master devices, those procedures that only apply to master devices that use reserved (scheduled) operations, and those operations that only apply to the bus master.

The master device procedures that apply to all master devices are:

| | |
|---|---|
| -------------- | Global data definations. |
| MasterDevice() | Master device top level operation. |
| Initialize() | Set initial conditions for master device operation. |
| NotInRingFrame() | Process frames received while not in the virtual ring. |
| InRingFrame() | Process frames received while in the virtual ring. |
| EnterRing() | Procedure used to enter device into virtual ring. |
| SendSetSuccessor() | Procedure that responds to a SOLICIT_SUCCESSOR or a SOLICIT_IN_RING frame with a SET_SUCCESSOR frame. |
| SolicitEntry() | Procedure used to invite devices to enter virtual ring. |
| TokenReceived() | Operation when TOKEN is received. |
| SendQueuedFrame() | Procedure that is used to send a queued frame. |
| TimeSync() | Operation when TIME_SYNC is received. |
| DeltaTime() | Operation when DELTA_TIME is received. |
| SolicitMaster() | Operation when SOLICIT_BUS_MASTER is received. |
| PassToken() | Procedure to safely pass the token. |
| SetSuccessor() | Procedure that changes the successor device. |
| PatchRing() | Procedure that allows patching the virtual ring when a master device fails. |
| WhoFollows() | Send a WHO_FOLLOWS and update successor if a response is received. |
| SendReject() | Send a REJECT frame in response to a request. |
| CloseRing() | Procedure that closes the ring when the next device in the virtual ring does not accept the token. |
| GetSequence() | Get current sequence number (error recovery). |
| FindNewBusMaster() | Find a new bus master (error recovery). |
| FindAnySlave() | Procedure that test if any slave devices are active (error recovery). |

| | |
|---|---|
| SendResponse() | Procedure to respond to request (pseudo code in Slave Device section). |
| EchoTest() | Procedure to respond to a TEST frame (pseudo code in Slave Device section). |
| SendFrame() | Outputs a frame onto the network (interface function, no pseudo-code). |
| WaitForFrame() | Wait for frame address to this device. Length of wait time (in the absence of bus activity) is controlled by variable max_wait. This timer is restarted each time bus activity is observed. Note: function uses Recognize() (interface function, no pseudo-code). |
| WaitForAnyFrame() | Wait for a frame addressed to any device. Length of wait time is controlled by variable max_any. |
| DeQueue() | Get a frame from the next higher layer (interface function, no pseudo-code). |
| EnQueue() | Pass a frame up to the next higher layer (interface function, no pseudo-code) |
| StartCounter() | Starts a hardware counter (harwdare function, no pseudo-code). |
| StopCounter() | Stops a hardware counter (harwdare function, no pseudo-code). |
| StartCounter() | Resets a hardware counter (harwdare function, no pseudo-code). |
| MaxCounter() | Tests a hardware counter, returns TRUE if counter has reached, or passed, maximum value (harwdare function, no pseudo-code). |
| Recognize() | A function returns TRUE if an address matches the individual or any group address of the device (harwdare function, no pseudo-code). |

The procedures that apply mainly to devices that use reserved (scheduled) operations are:

| | |
|---|---|
| ReservedToken() | Operation when RESERVED_TOKEN received. |
| ClearReserve() | Operation that clears the reserved bus times just used (also used for error recovery). |
| ReserveTime() | Operation that reserves bus time. |

The master device procedures that apply only to the bus master are:

| | |
|---|---|
| BecomeBusMaster() | Operation performed when device becomes bus master. |
| BecomeOnlyMaster() | Operation performed when device becomes the only master device on the bus. |
| SendTimeSync() | Send TIME_SYNC and adjust token. |
| RequestDelta() | Operation when REQUEST_DELTA_TIME received. |

The slave device procedures consist of:

| | |
|---|---|
| SlaveDevice() | Slave device top level operation. |
| SendResponse() | Procedure to respond to request. |
| UseToken() | Procedure for slave device to use token for use for one transactions (optional). |
| EchoTest() | Procedure to respond to a TEST frame. |
| SendFrame() | Outputs a frame onto the network (interface function, no pseudo-code). |
| WaitForFrame() | Wait for frame from hardware. Length of wait time (in the absence of a frame controlled by veritable MAX_WAIT (interface function, no pseudo-code). |

| | |
|---|---|
| DeQueue() | Get a frame from the next higher layer (interface function, no pseudo-code). |
| EnQueue() | Pass a frame up to the next higher layer (interface function, no pseudo-code). |

Master Device Global Data Definations

The global data area holds common data and definations that are either used by multiple procedures or must remain between procedure invocations.

```
int device_operational;  /* Flag, TRUE if device thinks that
                            it is operational              */
int in_ring;             /* Flag, TRUE if device is in the
                            virtual ring                   */
int want_in_ring;        /* Flag, TRUE if the device wants to
                            enter the virtual ring         */
int only_master;         /* Flag, TRUE if this device is the
                            only active master device      */
int bus_master;          /* Flag, TRUE if device bus master */
int event_scheduled;     /* Flag, TRUE if device has an event
                            scheduled                      */
int want_scheduled;      /* Flag, TRUE if device has an event
                            to schedule                    */
int token_preempted;     /* Flag, TRUE if token preempted
                            by scheduled event             */ int predecessor;         /* Address of device before this
                            device in virtual ring         */
int successor;           /* Address of device after this
                            device in virtual ring         */
int last_solicit;        /* Last device to be solicited for
                            entry into virtual ring        */
int current_sequence;    /* Most recent time sequence number */
int current_time;        /* Current time value, increments
                            once every millisecond         */
int next_schedule;       /* Next time to schedule, relative
                            to current_time                */
int max_wait;            /* Maximum time to wait for input on
                            the bus                        */
int max_any;             /* Maximum time to wait when waiting
                            for any frame                  */
```

MasterDevice()

The following procedure defines the top level operation of the DTS-MAC in a master device.

```
MasterDevice()
{
    int status;
    struct GENERAL_FRAME *frame;

Initialize();
    while(device_operational) {
        if (only_master == TRUE) {
            status = SendQueuedFrame();
            if (status == FALSE) {
                SolicitEntry(&CANNED_TOKEN);
            }
        }
        else {
            frame = WaitForFrame();
            if (frame == NULL) {
                if (in_ring == TRUE) {
                    frame = &CANNED_TOKEN;
```

```
                }
                else {
                    BecomeOnlyMaster();
                    break;
                }
            }
            if (in_ring == PENDING) {
                if (frame->frame_type == TOKEN) {
                    in_ring = TRUE;
                    max_wait = SLOT_TIME * (MY_ADDRESS+3) * 2;
                }
                else in_ring = FALSE;
            }
            if (bus_master == PENDING) {
                if (frame->frame_type == DELTA_TIME) {
                    BecomeBusMaster();
                }
                else bus_master = FALSE;
            }
            if (in_ring == FALSE) NotInRingFrame(frame);
            else InRingFrame(frame);
        }
    }
}
```

Initialize()

The following procedure sets the initial conditions for master device operation.

```
Initialize()
{
    device_operational = TRUE;
    in_ring = FALSE;
    want_in_ring = FALSE;
    bus_master = FALSE;
    only_master = FALSE;
    event_scheduled = FALSE;
    want_scheduled = FALSE;
    token_preempted = FALSE;
    predecessor = MY_ADDRESS;
    successor = MY_ADDRESS;
    last_solicit = MY_ADDRESS;
    current_sequence = -1;
    current_time = 0;
    max_wait = SLOT_TIME * (MAX_MASTER+2) * 2;
    max_any = SLOT_TIME * 2;
}
```

NotInRingFrame()

Process frames received while not yet in the virtual ring.

```
NotInRingFrame(frame)
struct GENERAL_FRAME *frame;
{
    switch (frame->frame_type) {
        case TEST:
            EchoTest(frame)
            break;
        case SOLICIT_SUCCESSOR:
            EnterRing(frame);
            break;
        case SOLICIT_IN_RING:
            SendReject(frame);
            break;
```

```
            case SOLICIT_BUS_MASTER:
                SendReject(frame);
                break;
            case DATA_MESSAGE:
                EnQueue(frame);
                break;
            case REQUEST_WITH_RESPONSE:
                SendResponse(frame);
                break;
            default:
                ProtocolError(frame);
                break;
        }
}
```

InRingFrame()

Process frames received while in the virtual ring. This procedure is
called both from the MasterDevice() procedure and the PassToken()
procedure.

```
InRingFrame(frame)
struct GENERAL_FRAME *frame;
{
    switch (frame->frame_type) {
        case TEST:
            EchoTest(frame)
            break;
        case SOLICIT_IN_RING:
            SendSetSuccessor(frame);
            break;
        case TOKEN:
        case RETURN_TOKEN:
            TokenReceived(frame);
            break;
        case TIME_SYNC:
            TimeSync(frame);
            break;
        case DELTA_TIME:
            DeltaTime(frame);
            break;
        case WHO_FOLLOWS:
            PatchRing(frame);
            break;
        case SOLICIT_BUS_MASTER:
            SolicitMaster(frame);
            break;
        case RESERVED_TOKEN:
            ReservedToken(frame);
            break;
        case SET_SUCCESSOR:
            SetSuccessor(frame);
            break;
        case REQUEST_WITH_RESPONSE:
            SendResponse(frame);
            break;
        case DATA_MESSAGE:
            EnQueue(frame);
            break;
        case REQUEST_DELTA_TIME:
            RequestDeltaTime();
        case REJECT:
            break;
        default:
            ProtocolError(frame);
            break;
    }
}
```

EnterRing()

The following procedure is invoked when a device that is not yet in the virtual ring receives a SOLICIT_SUCCESSOR frame.

```
EnterRing(solicit)
struct SOLICIT_SUCCESSOR_FRAME *solicit;
{
    if (want_in_ring == TRUE) {
        predecessor = solicit->source;
        successor = solicit->follower;
        in_ring = PENDING;
        SendSetSuccessor(solicit);
    }
    else {
        SendReject(solicit);
    }
}
```

SendSetSuccessor()

The following procedure sends a set successor frame. It is used both as part of EnterRing() and as a response to SOLICIT_IN_RING request.

```
SendSetSuccessor(frame)
struct GENERAL_FRAME *frame;
{
    CANNED_SET_SUCCESSOR.address = frame->source;
    SendFrame(&CANNED_SET_SUCCESSOR);
}
```

SolicitEntry()

Procedure used to invite devices to enter virtual ring.

```
SolicitEntry(token)
struct TOKEN_FRAME *token;
{
    struct GENERAL_FRAME *frame;
    int status;
    int address;
    int wait_time;
    int slot;
    if (((MY_ADDRESS + 1) & 0x1F) != successor) {
        last_solicit = last_solicit + 1;
        if (last_solicit == successor) {
            last_solicit = MY_ADDRESS + 1;
        }
        CANNED_SOLICIT_SUCCESSOR.address = last_solicit;
        CANNED_SOLICIT_SUCCESSOR.follower = successor;
        SendFrame(&CANNED_SOLICIT_SUCCESSOR);
        frame = WaitForFrame();
        if (frame != NULL && frame->frame_type == SET_SUCCESSOR) {
            SetSuccessor(frame);
            token->frame_type = TOKEN;
            token->address = last_solicit;
            status = PassToken(token);
```

```
            if (status == OK) {
                successor = last_solicit;
                last_solicit = MY_ADDRESS;
                only_master = FALSE;
                return PASSED;
            }
        }
    }
    return NOTPASSED;
}
```

TokenReceived()

The following procedure defines device operation when a token is received.

```
TokenReceived(token)
struct TOKEN_FRAME *token;
{
    int address;
    int status;
    int need_token;

if (bus_master && current_time > SEND_SYNC) {
        SendTimeSync(token);
    }
    if (token->frame_type == TOKEN) {
        ResetCounter(MAX_TOKEN_HOLD);
        predecessor = token->source;
    }
    StartCounter(MAX_TOKEN_HOLD);
    if (token->sequence != current_sequence) {
        GetSequence();
    }
    need_token = TRUE;
    while (!MaxCounter(MAX_TOKEN_HOLD) && need_token) {
        if (token->reserve[0].time != 0 &&
            current_time >= token->reserve[0].time) {
            StopCounter(MAX_TOKEN_HOLD);
            token_preempted = TRUE;
            token->frame_type = RESERVED_TOKEN;
            token->retn = MY_ADDRESS;
            token->address = token->reserve[0].device;
            status = PassToken(token);
            if (status == OK) return;
            else ClearReserve(token);
        }
        need_token = SendQueuedFrame();
        if (MaxCounter(SOLICIT_ENTRY)) {
            status = SolicitEntry(token);
            if (status == PASSED) return;
        }
    }
    if (want_scheduled == TRUE && event_scheduled == FALSE) {
        ReserveTime(token);
    }
    token->frame_type = TOKEN;
    token->address = successor;
    status = PassToken(token);
    if (status != OK) CloseRing(token);
    if (status != OK) BecomeOnlyMaster();
}
```

SendQueuedFrame()

The following procedure is used to send a queued frame (if one is available) and, if the frame sent is a DELEGATE_TOKEN or a REQUEST_WITH_RESPONSE, wait for the action requested.

```
SendQueuedFrame()
{
    struct GENERAL_FRAME *frame;
    struct GENERAL_FRAME *input;

frame = DeQueue(NORMAL);
    if (frame != NULL) {
        SendFrame(frame);
        if (frame->frame_type = DELEGATE_TOKEN) {
            input = WaitForAnyFrame();
            if (input != NULL) {
                if (Recognize(input->address)) {
                    switch (frame->frame_type) {
                        case DATA_MESSAGE:
                            EnQueue(frame);
                            break;
                        case REQUEST_WITH_RESPONSE:
                            SendResponse(frame);
                            break;
                        default:
                            ProtocolError(frame);
                            break;
                    }
                }
                else {
                    input = WaitForAnyFrame();
                }
            }
        }
        if (frame->frame_type = REQUEST_WITH_RESPONSE) {
            max_wait = 2 * SLOT_TIME;
            input = WaitForFrame();
            if (input != NULL) {
                EnQueue(input);
            }
            max_wait = 2 * SLOT_TIME * (MY_ADDRESS+3);
        }
        return TRUE;
    }
    return FALSE;
}
```

TimeSync()

The following procedure is performed when a TIME_SYNC frame is received. The purpose of this procedure, and the DeltaTime() procedure that follows is to keep all devices using the same current time when the devices have the token. Devices may have different current times when they do not have the token but this does not effect DTS-MAC opration.

```
TimeSync(time_sync)
struct TIME_SYNC_FRAME *time_sync;
{
    if (want_scheduled = TRUE) {
        next_schedule = next_schedule - current_time;
    }
    current_sequence = time_sync->sequence;
    current_time = 0;
}
```

DeltaTime()

The following procedure is performed when a DELTA_TIME frame is received. Note that even though DELTA_TIME frames are requested by a single device, they are addressed to all devices. Thus, even if multiple devices missed the last TIME_SYNC frame, they all have an opportunity to get the current time when any DELTA_TIME frame is sent.

```
DeltaTime(delta_time)
struct DELTA_TIME_FRAME *delta_time;
{
    if (current_sequence != delta_time->sequence) {
        if (want_scheduled = TRUE) {
            next_schedule = next_schedule -
                current_time + delta_time->delta;
        }
        current_sequence = delta_time->sequence;
        current_time = delta_time->delta;
    }
}
```

SolicitMaster()

When a device receives a SOLICIT_BUS_MASTER frame, it performs the following actions. Note that the device does not decide that it is really the bus master unless it receives a REQUEST_DELTA_TIME frame *immediately* after the SOLICIT_BUS_MASTER frame.

```
SolicitMaster(frame)
struct SOLICIT_BUS_MASTER_FRAME *frame;
{
    if (frame->sequence == current_sequence) {
        bus_master = PENDING;
        CANNED_CLAIM_BUS_MASTER.address = frame->address;
        SendFrame(&CANNED_CLAIM_BUS_MASTER);
    }
    else {
        SendReject(frame);
    }
}
```

PassToken()

This procedure is responsible for making sure that the token is not lost when this device attempt to pass it.

```
PassToken(token)
struct TOKEN_FRAME *token;
{
    int retry;
    struct GENERAL_FRAME *input;

for (retry = 0; retry < MAX_RETRY; ++retry) {
        SendFrame(token);
        input = WaitForAnyFrame();
        if (input != NULL) {
            if (Recognize(input->address)) {
                InRingFrame(input);
            }
            return OK;
        }
    }
    return FAILED;
}
```

SetSuccessor()

This procedure changes the successor device when a device is added or removed from the virtual ring.

```
SetSuccessor(set_successor)
struct SET_SUCCESSOR_FRAME *set_successor;
{
    successor = set_successor->source;
}
```

PatchRing()

Procedure that allows patching the virtual ring when a master device fails. This procedure is triggered when a device receives a WHO_FOLLOWS frame.

```
PatchRing(who_follows)
struct WHO_FOLLOWS_FRAME *who_follows;
{
    if (who_follows->follower == MY_ADDRESS) {
        CANNED_SET_SUCCESSOR.address = who_follows->source;
        SendFrame(&CANNED_SET_SUCCESSOR);
    }
}
```

WhoFollows()

This procedure sends a who follows frame and, if there is a reply, updates the successor address and passes the token.

```
WhoFollows(frame)
struct TOKEN_FRAME *token;
{
    struct GENERAL_FRAME *frame;

CANNED_WHO_FOLLOWS.follower = successor;
    for (retry = 0; retry < MAX_RETRY; ++retry) {
        SendFrame(&CANNED_WHO_FOLLOWS);
        frame = WaitForFrame();
        if (frame != NULL && frame->frame_type == SET_SUCCESSOR) {
            SetSuccessor(frame);
            status = PassToken(token);
            return status;
        }
    }
    return FAILED;
}
```

SendReject()

This procedure replies to a frame with a REJECT.

```
SendReject(frame)
struct GENERAL_FRAME *frame;
{
    CANNED_REJECT.address = frame->source;
    CANNED_REJECT.source = MY_ADDRESS;
    SendFrame(&CANNED_REJECT);
}
```

CloseRing()

Procedure applied when unable to pass the token to the next device on the virtual ring. The procedure first tries to find the device that follows the device to which that they usually pass the token. If this fails, the procedure searches for the next device in the virtual ring.

```
CloseRing(token)
struct TOKEN_FRAME *token;
{
    int status;
    int address;
    int retry;
    struct GENERAL_FRAME *frame;

status = WhoFollows(token);
    if (status != OK) {
        address = (successor+1) & 0x1F;
        while ((address != MY_ADDRESS) && status != OK) {
            for (retry = 0; retry < MAX_RETRY; ++retry) {
                CANNED_SOLICIT_IN_RING.address = address;
                SendFrame(&CANNED_SOLICIT_IN_RING);
                frame = WaitForFrame();
                if (frame != NULL)
                    if (frame->frame_type == SET_SUCCESSOR) {
                        SetSuccessor(frame);
                        token->address = successor;
                        status = PassToken(Token);
                        break;
                    }
            }
        }
    }
    return status;
}
```

GetSequence()

The following procedure defines error recovery procedure applied when a device receives a token with a sequence number different then the devices current sequence number (latest sequence number received).

```
GetSequence(token)
struct TOKEN_FRAME *token;
{
    int retry;
struct DELTA_TIME_FRAME *delta_time;

retry = 0;
    while (token->sequence != current_sequence) {
        SendFrame(&CANNED_REQUEST_DELTA_TIME);
        delta_time = WaitForFrame();
        if (delta_time != NULL) {
            if (delta_time->sequence != current_sequence) {
                Error(PROTOCOL);
            }
            current_sequence = delta_time->sequence;
        }
        if (retry++ == MAX_RETRY) {
            retry = 0;
            FindNewBusMaster(token);
        }
    }
}
```

FindNewBusMaster()

The following procedure defines error recovery procedure applied when there is no reply to messages addressed to the bus master. Note that the procedure first attempts to get the devices that have reserved time requirements to be bus master. Only if none of these device can become bus master does this device search the entire address list looking for a device to be bus master. If this search fails, the device assumes that the problem may be internal to the device (bad transmitter or receiver) and enters an error state.

```
FindNewBusMaster(token)
struct TOKEN_FRAME *token;
{
    struct GENERAL_FRAME *frame;
    int retry;
    int address;
    int wait_time;
    int slot;

for (slot = 0; token->reserve[slot].time != 0; ++slot) {
        address = token->reserve[slot].device;
        for (retry = 0; retry < MAX_RETRY; ++retry) {
            CANNED_SOLICIT_BUS_MASTER.address = address;
            SendFrame(CANNED_SOLICIT_BUS_MASTER);
            frame = WaitForFrame();
            if (frame != NULL) {
                if (frame->frame_type == CLAIM_BUS_MASTER) {
                    return;
                }
            }
        }
    }
    for (address = 0; address <= MAX_MASTER; ++address) {
        for (retry = 0; retry < MAX_RETRY; ++retry) {
            CANNED_SOLICIT_BUS_MASTER.address = address;
            SendFrame(CANNED_SOLICIT_BUS_MASTER);
            frame = WaitForFrame();
            if (frame != NULL) {
                if (frame->frame_type == CLAIM_BUS_MASTER) {
                    return;
                }
            }
        }
    }
    Error(BLIND);
}
```

FindAnySlave()

The following procedure is used by error recovery procedures after no other master devices are found to to determine if this device can communicate with any other devices.

```
FindAnySlave(token)
struct TOKEN_FRAME *token;
{
    struct GENERAL_FRAME *frame;
    int retry;
    int address;

for (address = MAX_MASTER+1; address <= MAX_DEVICE; ++address) {
        for (retry = 0; retry < MAX_RETRY; ++retry) {
            CANNED_TEST.address = address;
            SendFrame(CANNED_TEST);
            frame = WaitForFrame();
```

```
            if (frame != NULL) {
                if (frame->frame_type == TEST) {
                    return address;
                }
            }
        }
    }
    return ERROR;
}
```

ReservedToken()

Operation when RESERVED_TOKEN received.

```
ReservedToken(token)
struct TOKEN_FRAME token;
{
    int address;
    int status;
    int need_token;

ResetCounter(MAX_RESERVE_HOLD);
    StartCounter(MAX_RESERVE_HOLD);
    if (token->sequence != current_sequence) {
        GetSequence();
    }
    need_token = TRUE;
    while (!MaxCounter(MAX_RESERVE_HOLD) && need_token) {
        need_token = SendQueuedFrame();
    }
    ClearReserve(token);
    if (want_scheduled == TRUE) {
        ReserveTime(token);
    }
    token->frame_type = RETURN_TOKEN;
    token->address = token->retn;
    status = PassToken(token);
    if (status != OK) {
        token->frame_type = TOKEN;
        token->address = successor;
        status = PassToken(token);
    }
    if (status != OK) CloseRing(token);
    if (status != OK) BecomeOnlyMaster();
}
```

ClearReserve()

The following operation that clears the reserved bus time just used.

```
ClearReserve(token)
struct TOKEN_FRAME *token;
{
    int slot;

for (slot = 0; slot < MAX_SLOTS; ++slot) {
        token->reserve[slot].device = token->reserve[slot+1].device;
        token->reserve[slot].hold = token->reserve[slot+1].hold;
        token->reserve[slot].time = token->reserve[slot+1].time;
    }
    event_scheduled = FALSE;
}
```

ReserveTime()

Operation that reserves bus time. Since the token is kept in time sequence, the reservation must be added into the list of reservations at the correct point. Note that the time reserved should always be a minimum of the reserved hold time from the previous reservation and a minimum of MAX_RESERVE_HOLD from the following reservation.

```
ReserveTime(token)
struct TOKEN_FRAME token;
{
    int slot;
    int my_slot;
    int move;

my_slot = -1;
    move = FALSE;
    for (slot = 0; slot < MAX_SLOTS; ++slot) {
        if (token->reserve[slot].time == 0) {
            my_slot = slot;
            break;
        }
        if (token->reserve[slot].time > next_schedule) {
            my_slot = slot;
            move = TRUE;
            break;
        }
    }
    if (move = TRUE) {
        if (token->reserve[MAX_SLOT-1].time != 0) {
            Error(CONFIGURATION);
            return;
        }
        for (slot = MAX_SLOT-1; slot > my_slot; --slot) {
            token->reserve[slot+1].device =
                token->reserve[slot].device;
            token->reserve[slot+1].hold =
                token->reserve[slot].hold;
            token->reserve[slot+1].time =
                token->reserve[slot].time;
        }
    }
    token->reserve[my_slot].device == MY_ADDRESS;
    token->reserve[my_slot].time == next_schedule;
    token->reserve[my_slot].hold == MAX_RESERVE_HOLD;
    want_scheduled = FALSE;
    event_scheduled = TRUE;
}
```

BecomeBusMaster()

This operation is performed when a device becomes bus master. The setting of the MAX_WAIT time to 4 slot times allows the bus master to be the device that tries to recover the bus if the device that holds the token fails without preempting the token holder during various legal operations (e.g. in request with response) where the bus may become idle for short (less then 2 slot times) periods.

```
BecomeBusMaster()
{
    max_wait = SLOT_TIME * 4;
    bus_master = TRUE;
}
```

BecomeOnlyMaster()

This operation is performed when a device thinks that it is the only master on the bus. The device first tests to see if it can communicate with any device before if takes sole control of the bus.

```
BecomeOnlyMaster()
{
    int status;

status = FindAnySlave();
    if (status == ERROR) {
        Error(DEAF);
        device_operational = FALSE;
    }
    else {
        max_wait = SLOT_TIME * 2;
        bus_master = TRUE;
        only_master = TRUE;
        in_ring = TRUE;
        status = OK;
    }
    return status;
}
```

SendTimeSync()

This operation is performed when the bus master needs to send a TIME_SYNC frame. The procedure creates a new current time reference and adjusts the token to reflect this new time reference. Note that the adjustment procedure forces a minimum delay of 1.

```
SendTimeSync(token)
struct TOKEN_FRAME *token;
{
    int slot;

for (slot = 0; slot < MAX_SLOTS; ++slot) {
        if (token->reserve[slot].time = 0) {
            break;
        }
        if (token->reserve[slot].time > current_time) {
            token->reserve[slot].time -= current_time;
        }
        else {
            token->reserve[slot].time = 1;
        }
    } current_sequence = (current_sequence + 1) & 0xFF;
    token->sequence = current_sequence;
    CANNED_DELTA_TIME.sequence = current_sequence;
    SendFrame(&CANNED_DELTA_TIME);
}
```

RequestDeltaTime()

This operation is performed when REQUEST_DELTA_TIME received. Note that only the bus master should receive this request, and that it is always broadcast (not sent specifically to the device that made the request).

```
RequestDeltaTime(frame)
struct REQUEST_DELTA_TIME_FRAME *frame;
```

```
    {
        if (bus_master == TRUE) {
            if (frame->sequence != current_sequence) {
                ProtocolError(frame);
            }
            CANNED_DELTA_TIME.sequence = current_sequence;
            CANNED_DELTA_TIME.delta = current_time;
            SendFrame(&CANNED_DELTA_TIME);
        }
        else {
            Error(PROTOCOL);
        }
    }
```

SlaveDevice()

The following procedure defines the top level operation of the DTS-MAC in a slave device.

```
SlaveDevice()
{
    struct GENERAL_FRAME *frame;

max_wait = SLOT_TIME * 2;
    while(TRUE) {
        frame = NULL;
        while (frame == NULL) {
            frame = WaitForFrame();
        }
        switch (frame->frame_type) {
                case DATA_MESSAGE:
                case RESPONSE:
                    EnQueue(frame);
                    break;
                case REQUEST_WITH_RESPONSE:
                    SendResponse(frame);
                    break;
                case DELEGATE_TOKEN:
                    UseToken();
                    break;
                default:
                    break;
        }
    }
}
```

SendResponse();

The slave device uses the following procedure to respond to request for response. The slave responds with a frame if one is available or an ACK is no frame is available.

```
SendResponse(frame)
struct GENERAL_FRAME *request;
{
    struct GENERAL_FRAME *frame;

Enqueue(request);
    frame = DeQueue(NORMAL);
    if (frame == NULL) {
        frame = &CANNED_ACK;
    }
    frame->address = request->source;
}
```

UseToken()

The following procedure defines how a slave device can be given token to use for one transactions. This procedure is optional and does not have to be included in slave devices that do not use this feature.

```
UseToken(frame)
struct DELEGATE_TOKEN_FRAME *frame;
{
    struct GENERAL_FRAME *frame;
    struct GENERAL_FRAME *input;

frame = DeQueue(DELEGATE);
    if (frame == NULL) {
        frame = &CANNED_ACK;
    }
    SendFrame(frame);
    if (frame->frame_type = REQUEST_WITH_RESPONSE) {
        input = WaitForFrame();
        if (input != NULL) {
            EnQueue(input);
        }
    }
}
```

EchoTest()

The following procedure echos the packet received. It is used primarily to test is a device is active on the network.

```
EchoTest(frame)
struct GENERAL_FRAME *frame;
{
    frame->address = frame->source;
    frame->source = MY_ADDRESS;
    SendFrame(frame);
}
```

I claim:

1. A data processing system comprising:
 a communication bus; and
 a multiplicity of data handling devices connected to the bus, each device communicating to the other devices through the bus by means of an encoded bus token signal passed on the communication bus from one device to another in an established logical order, the device currently in possession of the bus token signal being allowed to transmit over the bus, for each of certain devices of the data handling devices the bus token signal providing an indication of a time at which each certain device is to temporarily gain possession of the bus token signal out of the established order and perform a respective time critical operation, each indication of time on the bus token signal referencing the time of the respective time critical operation.

2. A data processing system as claimed in claim 1 wherein the bus token signal further provides means for returning the bus token signal to the device that was in possession of the bus token signal at the time a certain device gained possession of the bus token signal such that the order in which the bus token signal is passed from one device to another is resumed.

3. A data processing system as claimed in claim 1 wherein the bus token signal provides an indication of a last transmitted time synchronization message to synchronize the devices with respect to each other.

4. A data processing system as claimed in claim 3 wherein one of the devices serves as a bus master which broadcasts and provides time synchronization messages over the bus for devices to synchronize themselves to the last transmitted synchronization message indicated on the bus token signal.

5. A data processing system as claimed in claim 4 wherein the bus master further provides current synchronization time to the other devices upon request.

6. A data processing system as claimed in claim 1 wherein one of the devices serves as a bus master which time synchronizes each of the devices connected to the bus to each other.

7. A data processing system as claimed in claim 1 wherein each device has an address by which other devices communicate messages to the device through the bus, the address being of one size to reference a source and a different size to reference a destination.

8. A data processing system as claimed in claim 7 wherein the address to reference a source corresponds to a unique portion of the address referencing a destination.

9. A local area network comprising:
a communication bus; and
a plurality of devices connected to the bus, each device communicating to the other devices through the bus by means of an encoded bus token signal passable on the bus from one device to another in an established logical order to enable one device at a time to transmit over the bus, the bus token signal comprising:
an indicator element for indicating a last transmitted time synchronization message, each device upon receiving the bus token signal checking for an indication of receipt of the message; and
a reservation element for indicating times at which the bus token signal is to be passed from the device in possession of the bus token signal to a certain device not necessarily the next device in the established order such that the certain device is able to perform a time dependent operation.

10. A local area network as claimed in claim 9 wherein the indicator element indicating the last transmitted time synchronization message is updated by one of the devices, said device serving as a bus master and transmitting time synchronization messages.

11. A local area network as claimed in claim 9 wherein the reservation means further includes a return address corresponding to the address of the device in possession of the bus token signal when the bus token signal is passed to the certain device out of established order.

12. A data processing system comprising:
a communication bus;
a multiplicity of devices including a master device connected to the bus, each device communicating to other devices through the bus, the master device periodically providing time synchronization messages to the other devices at substantially a same time to synchronize the devices connected to the bus; and
an encoded bus token signal for indicating the last time synchronization message provided by the master device to the other devices, the bus token signal being passed on the communication bus from one device to another to enable each device to check the last time synchronization message as indicated by the bus token signal.

13. In a data processing system having a multiplicity of devices connected to a communication bus, each device communicating to other devices through the bus, a method for distributing bus communication time comprising the steps of:
a) providing an encoded bus token signal for passing on the communication bus from one device to another in an established logical order, said bus token signal:
allowing bus transmission time to a device currently in possession of the bus token signal, and
indicating a time at which each of certain devices connected to the bus is to temporarily gain possession of the bus token signal out of the established order to subsequently perform a time critical operation;
b) passing the bus token signal on the bus from one device to another in the established logical order, the device currently in possession of the bus token signal being allowed to transmit over the bus; and
c) at a time indicated on the bus token signal, interrupting the device currently in possession and passing the bus token signal to the certain device which is to gain possession of the bus token signal out of the established order.

14. A method as claimed in claim 13 further comprising the step of returning the bus token signal to the device that was in possession of the bus token signal at the time the certain device gained possession of the bus token signal such that the step of passing the bus token signal in the established logical order is resumed.

15. A method as claimed in claim 13 wherein the step of providing an encoded bus token signal includes providing a bus token signal having an indication of a last transmitted time synchronization message to synchronize respective internal clocks of the devices with respect to each other.

16. A method as claimed in claim 15 further comprising the step of designating one of the devices as a bus master which broadcasts and provides time synchronization messages over the bus for the other devices to synchronize themselves.

17. A method as claimed in claim 16 further comprising the step of providing current synchronization time to the other devices on request by a device to the bus master.

* * * * *